(12) United States Patent
Duron et al.

(10) Patent No.: US 8,400,272 B2
(45) Date of Patent: Mar. 19, 2013

(54) METHOD AND DEVICE FOR IMPROVING THE SIGNAL TO NOISE RATIO (SNR) OF A BACKSCATTER SIGNAL RECEIVED FROM A RADIO FREQUENCY IDENTIFICATION (RFID) TAG

(75) Inventors: Mark W. Duron, East Patchogue, NY (US); Sean A. Connolly, Stony Brook, NY (US); Richard T. Knadle, Dix Hills, NY (US); Martin Strzelczyk, New Market, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 769 days.

(21) Appl. No.: 12/630,356

(22) Filed: Dec. 3, 2009

(65) Prior Publication Data
US 2011/0133890 A1    Jun. 9, 2011

(51) Int. Cl.
*H04Q 5/22* (2006.01)
(52) U.S. Cl. ....... 340/10.1; 340/10.3; 375/296; 375/346
(58) Field of Classification Search .................. 375/296; 340/10.1, 10.3; 381/94.7
See application file for complete search history.

(56) References Cited

U.S. PATENT DOCUMENTS

| 4,968,967 | A  | 11/1990 | Stove |
| 5,940,025 | A  | 8/1999  | Koehnke et al. |
| 6,734,797 | B2 | 5/2004  | Shanks et al. |
| 7,551,140 | B2 | 6/2009  | Knadle, Jr. et al. |

*Primary Examiner* — Daniel Wu
*Assistant Examiner* — Frederick Ott
(74) *Attorney, Agent, or Firm* — Nong-Qiang Fan; Kenneth A. Haas

(57) ABSTRACT

A method and device enables improving a signal to noise ratio (SNR) of a backscatter signal received from a radio frequency identification (RFID) tag. The method includes generating a continuous wave (CW) carrier signal at the reader device (step 505). An amplitude modulation (AM) noise component of the CW carrier signal is then detected (step 510). The AM noise component is inverted to an inverted noise signal (step 515), and the inverted noise signal is summed with the CW carrier signal to provide an AM noise cancelled carrier signal (step 520). The AM noise cancelled carrier signal is then transmitted from an antenna of the reader device (step 525), and the backscatter signal is received at the reader device in response to transmission of the AM noise cancelled carrier signal (step 530).

13 Claims, 4 Drawing Sheets

METHOD AND DEVICE FOR IMPROVING THE SIGNAL TO NOISE RATIO (SNR) OF A BACKSCATTER SIGNAL RECEIVED FROM A RADIO FREQUENCY IDENTIFICATION (RFID) TAG

FIELD OF THE DISCLOSURE

The present invention relates generally to wireless communication devices, and in particular to improving an SNR of a backscatter signal received at an RFID reader device from an RFID tag.

BACKGROUND

Radio frequency identification (RFID) tags are now widely used to mark, inventory and track various products. RFID tags generally transmit to a handheld or robotically controlled reader device a radio frequency signal that includes product information. RFID tags generally include an integrated circuit for storing and processing information, a transceiver for transmitting and receiving RF signals, and an antenna. Some RFID tags are active RFID tags and include their own battery power source. Passive RFID tags do not have their own power source and require receiving a power signal from a reader device to operate. For interrogating passive RFID tags, a reader generally transmits a continuous wave (CW) or modulated radio frequency (RF) signal to a tag. The tag receives the signal, and responds by modulating the signal and then "backscattering" an information response signal to the reader. The reader receives the response signal from the tag, and the response signal is demodulated, decoded and further processed.

Amplitude modulation (AM) present on the carrier wave transmitted from an RFID transmitter while a tag is backscattering appears as noise at the receiver. Sideband signals that backscattering produce are generally many orders of magnitude below an original transmitter power. By the time such sideband signals reach the reader device, they are even further orders of magnitude lower. The receiver employs a directional device to separate the incoming backscatter from the outgoing CW energy; however, any energy reflected back from an antenna of the reader device is summed with incoming backscatter signals. If the outgoing energy has sideband energy within it, such carrier sideband energy can obscure the sideband energy returning from the tags. Any AM noise on the carrier wave from the reader device can have this effect, and can thus limit the range of an RFID system.

Further, such noise is primarily proportional to the return from the transmitting antenna and generally cannot be mitigated by a current echo or carrier cancellation scheme. Various sources can cause such unwanted AM noise, including for example power supply ripple, power supply load pulling, local near field pickup, thermal noise in the transmitter amplifier chain, dynamic load changes imposed on the antenna by the environment, and digital noise.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
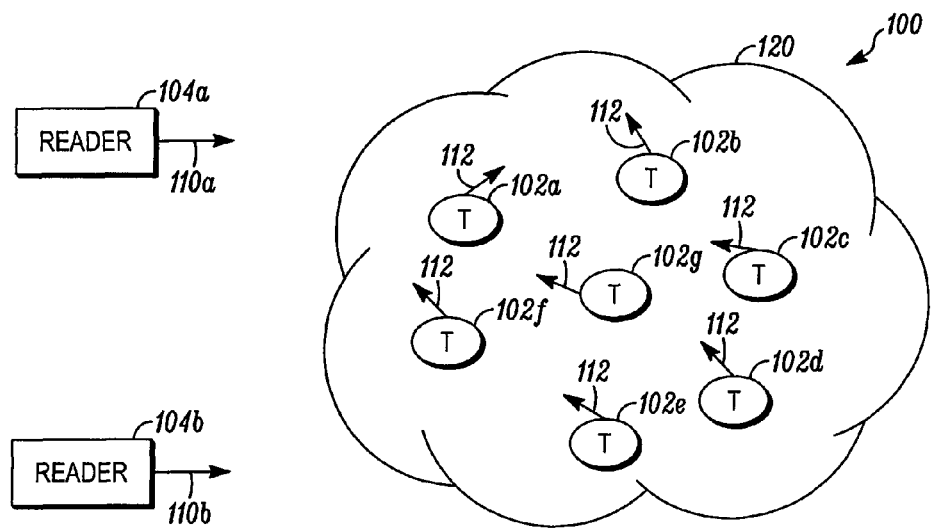
FIG. 1 is a system diagram illustrating an environment where RFID tag readers communicate with an exemplary population of RFID tags, according to an embodiment of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

According to some embodiments of the present invention, a method is provided for improving a signal to noise ratio (SNR) of a backscatter signal received at a radio frequency identification (RFID) reader device from an RFID tag. The method includes generating a continuous wave (CW) carrier signal at the reader device. An amplitude modulation (AM) noise component of the CW carrier signal is then detected. The AM noise component is inverted to an inverted noise signal, and the inverted noise signal is summed with the CW carrier signal to provide an AM noise cancelled carrier signal. The AM noise cancelled carrier signal is then transmitted from an antenna of the reader device, and the backscatter signal is received at the reader device in response to transmission of the AM noise cancelled carrier signal.

Embodiments of the present invention thus enable an RFID reader device to cancel wideband AM noise in a carrier signal transmitted from the reader device. By cancelling AM noise in the transmitted carrier signal, AM noise reflected back into a directional receiver by an antenna mismatch is reduced. That provides an increased signal to noise ratio (SNR) of the backscatter signal, and an improved range of the RFID reader device.

Before describing embodiments of the present invention in detail, it is helpful to describe an example RFID communications environment in which the invention may be implemented. FIG. 1 is a system diagram illustrating an environment 100 where RFID tag readers 104 communicate with an exemplary population 120 of RFID tags 102. As shown, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network.

As shown in FIG. 1, reader 104a transmits an interrogation signal 110 having a carrier frequency to the population of tags 120. Reader 104b transmits an interrogation signal 110b having a carrier frequency to the population of tags 120. Readers 104a and 104b typically operate in one or more of the frequency bands allotted for this type of RF communication. For example, frequency bands of 902-928 MHz and 2400-2483.5 MHz have been defined for certain RFID applications by the United States Federal Communication Commission (FCC).

Various types of tags 102 may be present in tag population 120 that transmit one or more response signals 112 to an interrogating reader 104, including by alternatively reflecting and absorbing portions of signal 110 according to a time-based pattern or frequency. This technique for alternately absorbing and reflecting signal 110 is referred to herein as backscatter modulation. Readers 104a and 104b receive and obtain data from response signals 112, such as an identification number of the responding tag 102. In the embodiments described herein, a reader may be capable of communicating with tags 102 according to any suitable communication protocol, including Class 0, Class 1, Electronic Product Code (EPC) Gen 2, other binary traversal protocols and slotted aloha protocols, any other protocols mentioned elsewhere herein, and future communication protocols.

Figure 2:
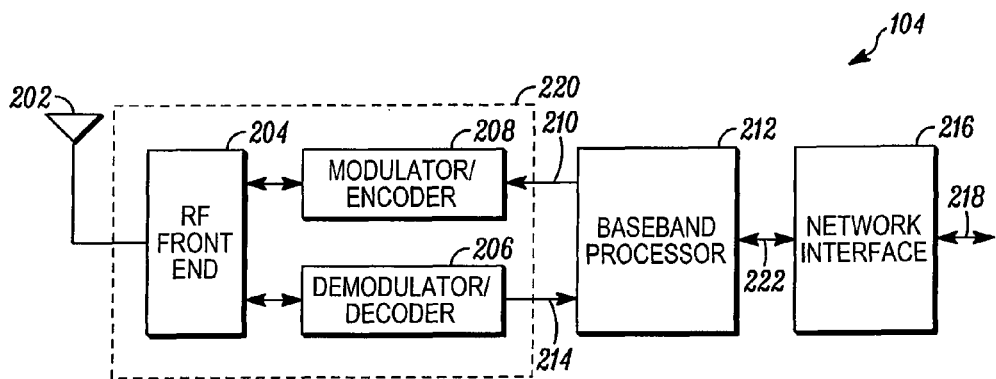
FIG. 2 is a block diagram illustrating some elements of an RFID reader, according to an embodiment of the present invention.

FIG. 2 is a block diagram of an example RFID reader 104. Reader 104 includes an antenna 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104. The processor 212 also processes computer readable program code components stored in a memory (not shown) of the reader 104 to implement various methods and functions of the reader 104 as described herein.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver portion 220 transmits the interrogation request via antenna 202.

Reader 104 includes antenna 202 for communicating with tags 102 and/or other readers 104. The antenna 202 may be any type of reader antenna known to persons skilled in the relevant art, including, but not limited to, a dipole, loop, Yagi-Uda, slot, or patch antenna type. For description of an example antenna suitable for reader 104, refer to U.S. Pat. No. 7,551,140, titled "Low Return Loss Rugged RFID Antenna," issued 23 Jun. 2009, which is incorporated by reference herein in its entirety.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In some embodiments, network interface 216 enables a wired and/or wireless connection with communications network 218. For example, network interface 216 may enable a wireless local area network (WLAN) link (including an Institute of Electrical and Electronics Engineers (IEEE) 802.11 WLAN standard link), a BLUETOOTH (Registered Trademark) link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a radio frequency (RF) front-end 204, a demodulator/decoder 206, and a modulator/encoder 208. These components of transceiver 220 may include software, hardware, and/or firmware, or any combination thereof, for performing their functions. An example description of these components is provided as follows.

Modulator/encoder 208 receives interrogation request 210, and is coupled to an input of RF front-end 204. Modulator/encoder 208 encodes interrogation request 210 into a signal format, modulates the encoded signal, and outputs the modulated encoded interrogation signal to RF front-end 204. For example, pulse-interval encoding (PIE) may be used in a Gen 2 embodiment. Furthermore, double sideband amplitude shift keying (DSB-ASK), single sideband amplitude shift keying (SSB-ASK), or phase-reversal amplitude shift keying (PR-ASK) modulation schemes may be used in a Gen 2 embodiment. Note that in an embodiment, baseband processor 212 may alternatively perform the encoding function of modulator/encoder 208.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214. Note that in an embodiment, baseband processor 212 may alternatively perform the decoding function of demodulator/decoder 206.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as is known to persons skilled in the relevant art(s).

Figure 3:
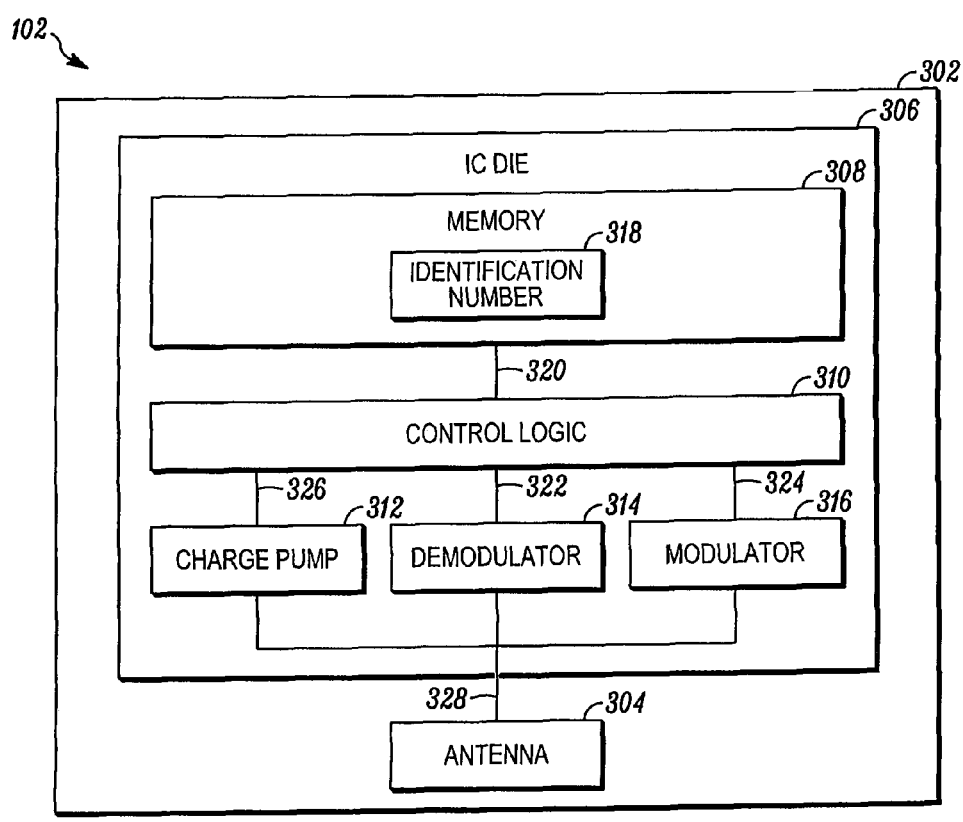
FIG. 3 is a block diagram illustrating some elements of an RFID tag, according to an embodiment of the present invention.

The present invention is applicable to any type of RFID tag. FIG. 3 shows a block diagram of a radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including dipole, loop, slot, or patch antenna type. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example embodiment of FIG. 3, IC 306 includes a memory 308, a control logic 310, a charge pump 312, a demodulator 314, and a modulator 316. An input of charge pump 312, an input of demodulator 314, and an output of modulator 316 are coupled to antenna 304 by antenna signal 328. Note that in the present disclosure, the terms "lead" and "signal" may be used interchangeably to denote the connection between elements or the signal flowing on that connection.

Memory 308 is typically a non-volatile memory, but can alternatively be a volatile memory, such as a DRAM. Memory 308 stores data, including an identification number 318. Identification number 318 typically is a unique identifier (at least in a local environment) for tag 102. For instance, when tag 102 is interrogated by a reader (e.g., receives interrogation signal 110 shown in FIG. 1), tag 102 may respond with identification number 318 to identify itself. Identification number 318 may be used by a computer system to associate tag 102 with its particular associated object/item.

Demodulator 314 is coupled to antenna 304 by antenna signal 328. Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on input signal 322. Control logic 310 controls the operation of RFID tag 102 based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112, which is received by reader 104. In an embodiment, modulator 316 includes a switch, such as a single pole, single throw (SPST) switch. The switch changes the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art. Modulator 316 and demodulator 314 may be referred to collectively as a "transceiver" of tag 102.

Charge pump 312 is coupled to antenna 304 by antenna signal 328. Charge pump 312 receives a radio frequency communication signal (e.g., a carrier signal transmitted by reader 104) from antenna 304, and generates a direct current (DC) voltage level that is output on a tag power signal 326. Tag power signal 326 is used to power circuits of IC die 306, including control logic 320.

In an embodiment, charge pump 312 rectifies the radio frequency communication signal of antenna signal 328 to create a voltage level. Furthermore, charge pump 312 increases the created voltage level to a level sufficient to power circuits of IC die 306. Charge pump 312 may also include a regulator to stabilize the voltage of tag power signal 326. Charge pump 312 may be configured in any suitable way known to persons skilled in the relevant art. For description of an example charge pump applicable to tag 102, refer to U.S. Pat. No. 6,734,797, titled "Identification Tag Utilizing Charge Pumps for Voltage Supply Generation and Data Recovery," which is incorporated by reference herein in its entirety. Alternative circuits for generating power in a tag are also applicable to embodiments of the present invention.

It will be recognized by persons skilled in the relevant art(s) that tag 102 may include any number of modulators, demodulators, charge pumps, and antennas. Tag 102 may additionally include further elements, including an impedance matching network and/or other circuitry. Embodiments of the present invention may be implemented in tag 102, and in other types of tags.

Embodiments described herein are applicable to all forms of tags, including tag "inlays" and "labels." A "tag inlay" or "inlay" is defined as an assembled RFID device that generally includes an integrated circuit chip (and/or other electronic circuit) and antenna formed on a substrate, and is configured to respond to interrogations. A "tag label" or "label" is generally defined as an inlay that has been attached to a pressure sensitive adhesive (PSA) construction, or has been laminated, and cut and stacked for application. One form of a "tag" is a tag inlay that has been attached to another surface, or between surfaces, such as paper, cardboard, etc., for attachment to an object to be tracked, such as an article of clothing, etc.

Example embodiments of the present invention are described in further detail below. Such embodiments may be implemented in the environments, readers, and tags described above, and/or in alternative environments and alternative RFID devices.

Figure 4:
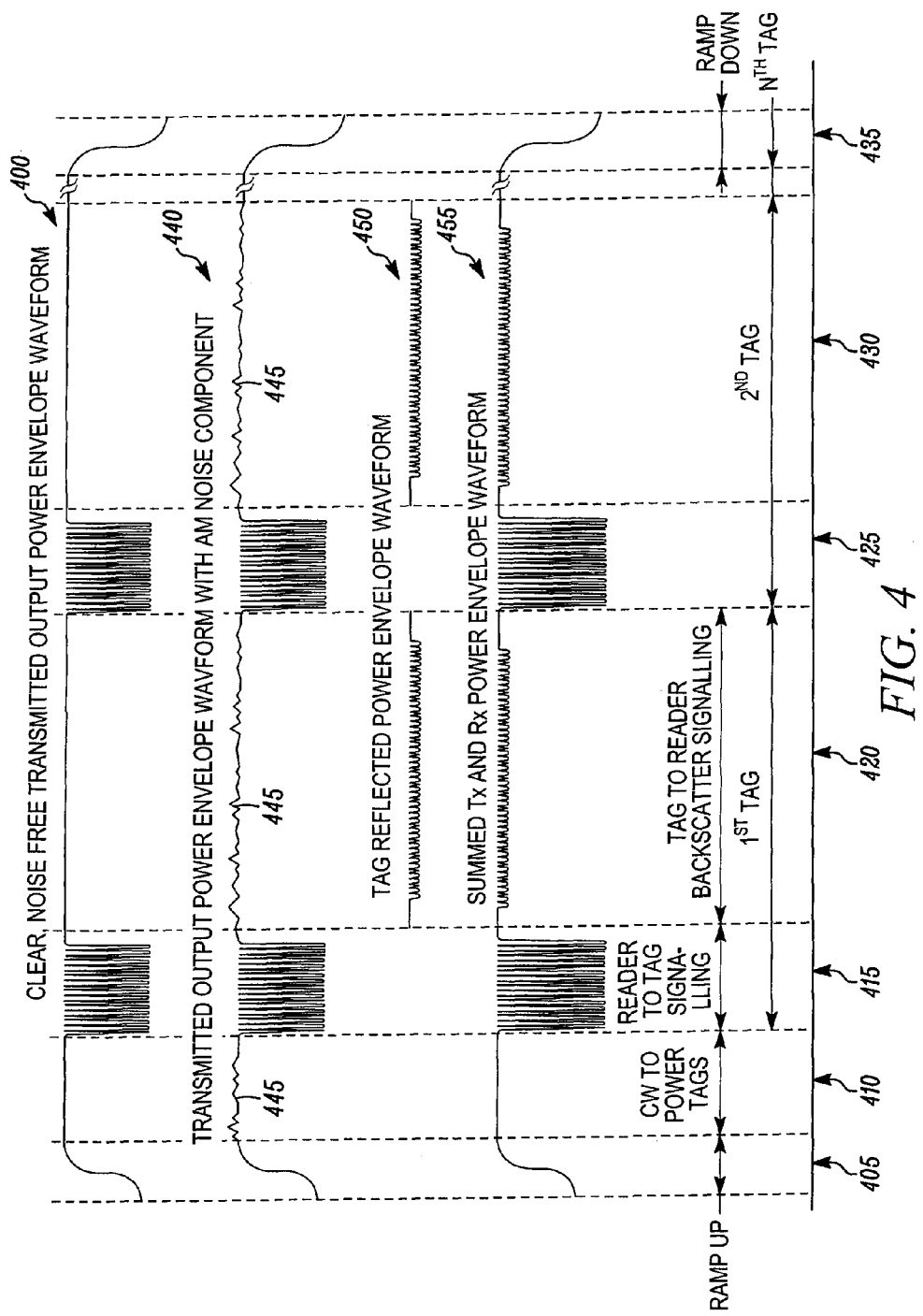
FIG. 4 is a diagram of four power envelope waveforms that illustrate advantages of the present invention.

FIG. 4 is a diagram of four power envelope waveforms that illustrate advantages of the present invention. Waveform 400 illustrates a clean, noise free transmitted output power envelope as may be transmitted from the antenna 202 of the reader device 104 using the teachings of the present invention. The waveform 400 includes a ramp up stage 405 where power is increased at the RF front-end 204 to a steady state. A continuous wave (CW) stage 410 is then used to provide power to the tags 102. A first reader to tag signaling stage 415 is then used to provide information to a first tag, such as the tag 102a. A first tag to reader backscatter signaling stage 420 is used to receive an information signal back from the first tag 102a. Next, a second reader to tag signaling stage 425 is used to provide information to a second tag, such as the tag 102b. A second tag to reader backscatter signaling stage 430 is used to receive an information signal back from the second tag 102. A similar sequence continues for "N" tags, until a ramp down stage 435.

Waveform 440 is similar to the waveform 400, but includes AM noise components 445 in each of the CW stage 410, and the tag to reader backscatter signaling stages 420, 430. As shown, the noise components 445 have the same amplitude and energy in the tag to reader backscatter signaling stages 420, 430 as in the CW stage 410. That is because the antenna 202 reflects the full un-attenuated amount of AM noise back to the RF front-end 204.

Waveform 450 illustrates tag reflected power envelopes for the first tag and the second tag, which appear only during the tag to reader backscatter signaling stages 420, 430, respectively. As shown, the power level of the waveform 450 is much lower than that of the waveform 440. Thus if the waveform 450 is combined with the AM noise components 445, the signal to noise ratio (SNR) of the backscatter signaling received at the reader device 104 may be unacceptably low.

Waveform 455 illustrates the summed noise free transmitted output power envelope waveform 400, which cancels the AM noise components 445 using the techniques of the present invention, and the tag reflected power envelope waveform 450. The signal shown in the waveform 455 thus provides an improved SNR and enables longer effective operating distances between the reader device 104 and the tags 102.

Figure 5:
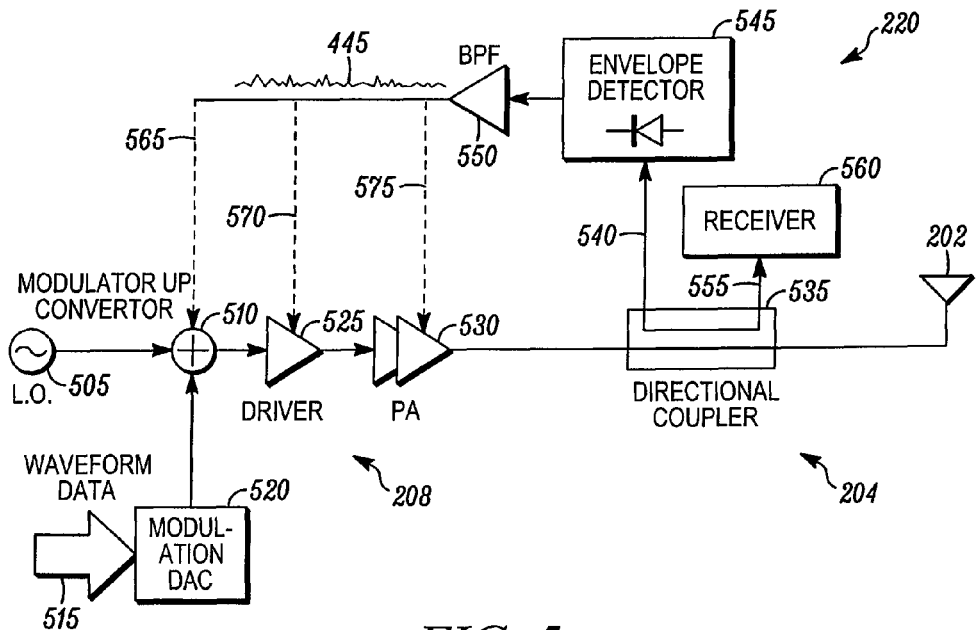
FIG. 5 is a circuit diagram illustrating further elements of a transceiver of an RFID reader device, according to an embodiment of the present invention.

FIG. 5 is a circuit diagram illustrating further elements of the transceiver 220 of the RFID reader device 104, according to an embodiment of the present invention. As will be understood by those having ordinary skill in the art, various elements of the modulator/encoder 208 and the RF front-end 204 comprise a generator for generating a continuous wave (CW) carrier signal at the RFID reader device 104. For example, a local oscillator (LO) 505 provides a carrier wave to a modulator up converter 510.

During a reader to tag signaling stage, such as the stages 415, 425 illustrated in FIG. 4, digital waveform data 515 is processed at a digital to analog converter (DAC) 520, and the resulting analog signal is mixed at the modulator up converter 510 with the carrier wave to produce a modulated carrier wave. The modulated carrier wave is input to a driver/modulator 525, which then provides a driver signal to a power amplifier (PA)/modulator 530.

However, during a tag to reader backscatter signaling stage, such as the stages 420, 430, the PA/modulator 530 outputs a CW carrier signal that is sampled and processed by a forward direction of a directional coupler 535. A forward direction path 540 from the directional coupler 535 is input to an envelope detector 545 that detects an envelope waveform of the CW carrier signal. For example, such an envelope waveform may comprise the transmitted output power envelope waveform 440, as shown in FIG. 4, and including the AM noise component 445.

A band-pass filter (BPF) 550 then operates in real time to dynamically cancel the output power envelope waveform, such as the waveform 400 shown in FIG. 4, of the CW carrier signal. The AM noise component 445 is fed back in real time such that it is inverted and summed with the CW carrier signal. That provides an AM noise cancelled carrier signal that is transmitted from the antenna 202. For example, the transmitted signal can be defined by the clean, noise-free transmitted output power envelope waveform 400 shown in FIG. 4.

Finally, a backscatter signal is received at the antenna 202 in response to the transmitted AM noise cancelled carrier signal. The backscatter signal is sampled and processed by a backward direction of the directional coupler 535. A backward direction path 555 of the directional coupler 535 then routes the backscatter signal to a receiver 560.

As shown in FIG. 5, to complete an AM noise leveling loop, the output of the BPF 550 can be fed back in real time to one of various elements using various feedback loops. For example, path 565 provides a servo loop to the modulator up converter 510. Alternatively, path 570 provides a servo loop to the driver/modulator 525. And, alternatively, path 575 provides a servo loop to the power amplifier/modulator 530. The shortest loop through the path 575 may provide the quickest feedback response; however, as will be understood by those having ordinary skill in the art, various other circuit design parameters may be considered to identify an appropriate path for the feedback signal. Depending on which path 565, 570, 575 is used, either the modulator up converter 510, the driver/modulator 525, or the power amplifier/modulator 530, respectively, may function as an inverter and summer. The inverter and summer inverts the AM noise component to an inverted noise signal and sums the inverted noise signal with the CW carrier signal to provide an AM noise cancelled carrier signal.

Figure 6:
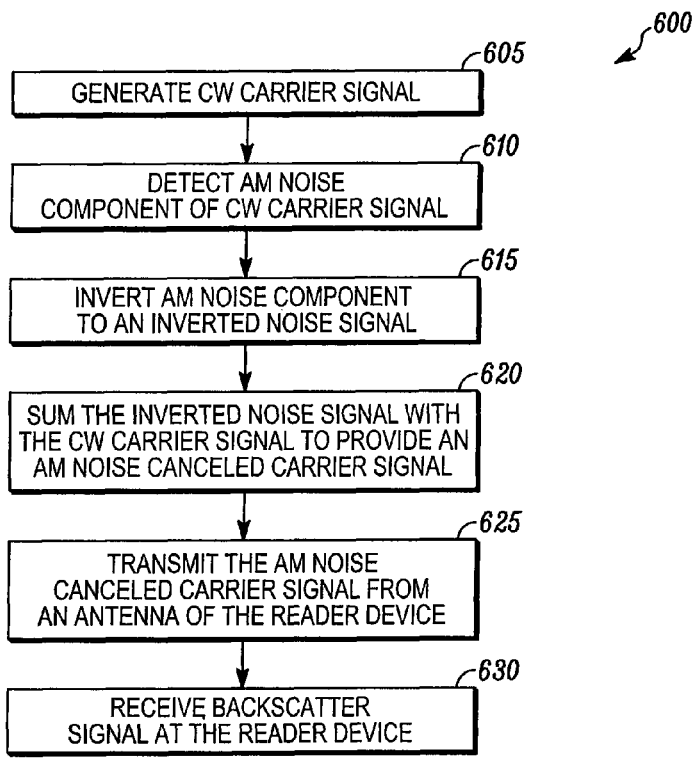
FIG. 6 is a flow diagram illustrating a method for improving a signal to noise ratio (SNR) of a backscatter signal received at an RFID reader device from an RFID tag, according to an embodiment of the present invention Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

FIG. 6 is a flow diagram illustrating a method 600 for improving a signal to noise ratio (SNR) of a backscatter signal received at an RFID reader device from an RFID tag, according to an embodiment of the present invention. For example, the method 600 can be performed by the reader device 104 described above. At step 605, a continuous wave (CW) carrier signal is generated at the reader device. At step 610, an amplitude modulation (AM) noise component of the CW carrier signal is detected. At step 615, the AM noise component is inverted to an inverted noise signal. At step 620, the inverted noise signal is summed with the CW carrier signal to provide an AM noise cancelled carrier signal. At step 625, the AM noise cancelled carrier signal is transmitted from an antenna of the reader device. Finally, at step 630, the backscatter signal is received at the reader device in response to transmission of the AM noise cancelled carrier signal.

Advantages of some embodiments of the present invention therefore include enabling an RFID reader device to cancel wideband AM noise in a carrier signal transmitted from the reader device. By cancelling AM noise in the transmitted carrier signal, AM noise reflected back into a directional receiver by an antenna mismatch can be reduced. That provides an increased signal to noise ratio (SNR) of a received backscatter signal, and an improved range of the RFID reader device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, or contains a list of elements does not include only those elements but may include other elements not expressly listed or inherent to such process, method, article, or apparatus. An element preceded by "comprises a . . . ", "has a . . . ", "includes a . . . ", or "contains a . . . " does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and system described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for improving a signal to noise ratio (SNR) of a backscatter signal received at a radio frequency identification (RFID) reader device from an RFID tag, the method comprising:
   generating a continuous wave (CW) carrier signal at the reader device;
   detecting an amplitude modulation (AM) noise component of the CW carrier signal;
   inverting the AM noise component to an inverted noise signal;
   summing the inverted noise signal with the CW carrier signal to provide an AM noise cancelled carrier signal;
   transmitting the AM noise cancelled carrier signal from an antenna of the reader device;
   receiving the backscatter signal at the reader device in response to transmission of the AM noise cancelled carrier signal; and
   wherein detecting the AM noise component comprises processing a sample of the CW carrier signal through a forward ordered direction of a directional coupler, an envelope detector, and a band pass filter.

2. The method of claim 1, wherein the inverted noise signal is summed with the CW carrier signal at a modulator up converter of the reader device.

3. The method of claim 1, wherein the inverted noise signal is summed with the CW carrier signal at a driver/modulator of the reader device.

4. The method of claim 1, wherein the inverted noise signal is summed with the CW carrier signal at a power amplifier/modulator of the reader device.

5. The method of claim 1, wherein the reader device is a handheld reader device.

6. The method of claim 1, wherein the reader device is mounted in a fixed location.

7. A radio frequency identification (RFID) reader device for improving a signal to noise ratio (SNR) of a backscatter signal received from an RFID tag, the device comprising:
   a generator for generating a continuous wave (CW) carrier signal at the reader device;
   a detector for detecting an amplitude modulation (AM) noise component of the CW carrier signal;

an inverter and summer for inverting the AM noise component to an inverted noise signal and summing the inverted noise signal with the CW carrier signal to provide an AM noise cancelled carrier signal;

a transmitter for transmitting the AM noise cancelled carrier signal;

a receiver for receiving the backscatter signal at the reader device in response to transmission of the AM noise cancelled carrier signal; and wherein detecting the AM noise component comprises processing a sample of the CW carrier signal through a forward ordered direction of a directional coupler, an envelope detector, and a band pass filter.

8. The device of claim 7, wherein the band pass filter is tuned to include an expected down converted bandwidth of the RFID tag.

9. The device of claim 7, wherein the inverter and summer is included in a modulator up converter.

10. The device of claim 7, wherein the inverter and summer is included in a driver/modulator.

11. The device of claim 7, wherein the inverter and summer is included in a power amplifier/modulator.

12. The device of claim 7, wherein the device is a handheld reader device.

13. A method for improving a signal to noise ratio (SNR) of a backscatter signal received at a radio frequency identification (RFID) reader device from an RFID tag, the method comprising:

generating a carrier signal at the reader device;

detecting an amplitude modulation (AM) noise component of the carrier signal;

providing an AM noise cancelled carrier signal by cancelling the AM noise component in the carrier signal using a feedback loop;

transmitting the AM noise cancelled carrier signal from an antenna of the reader device;

receiving the backscatter signal at the reader device in response to transmission of the AM noise cancelled carrier signal; and wherein detecting the AM noise component comprises processing a sample of the CW carrier signal through a forward ordered direction of a directional coupler, an envelope detector, and a band pass filter.

* * * * *